March 6, 1934.   C. W. MARSH   1,949,610
METHOD OF MAKING PACKING
Filed May 4, 1932
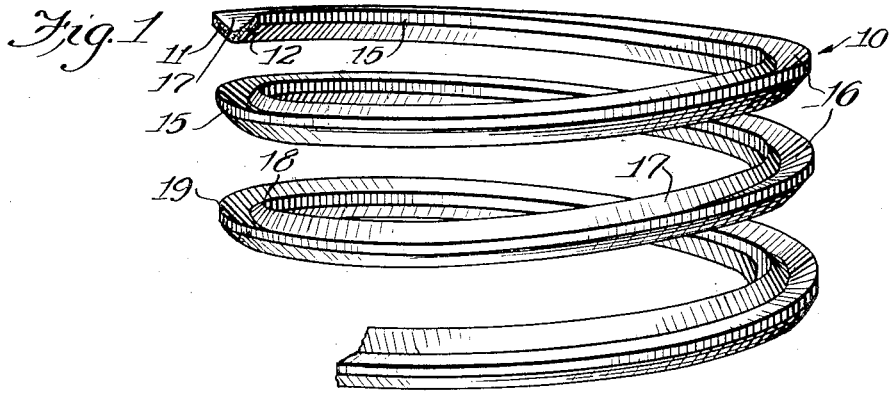
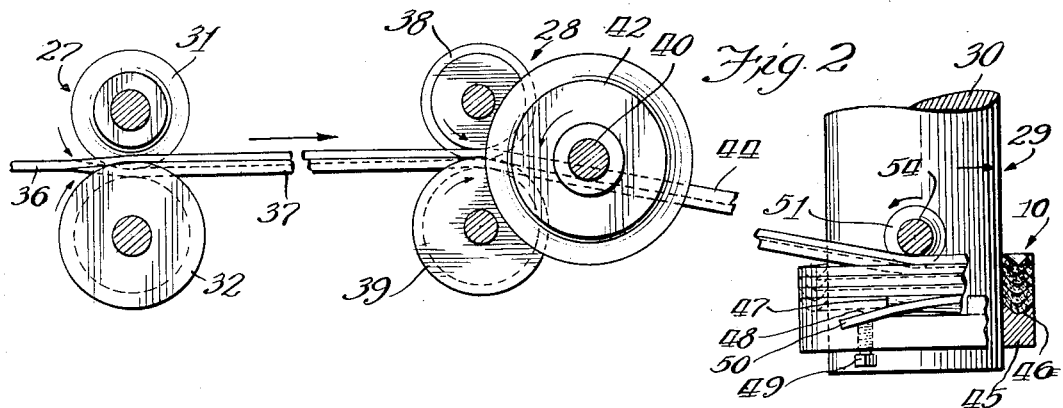
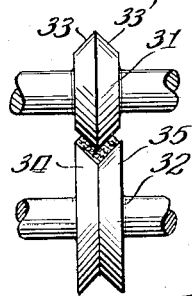
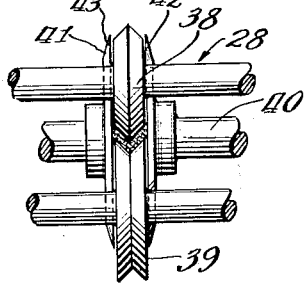
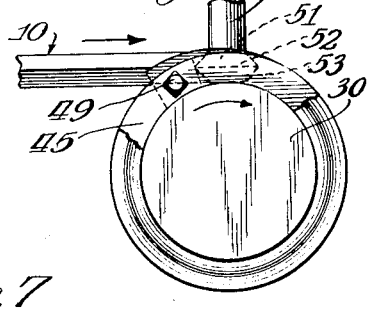
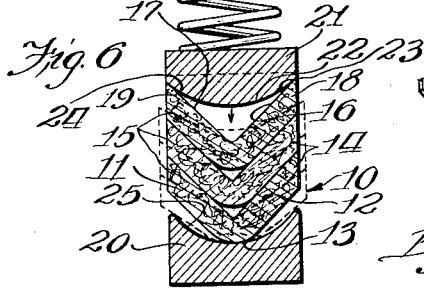
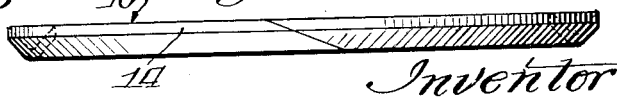
Inventor:
Charles W. Marsh.
By Williams, Bradbury, McCaleb
& Hinkle  Attys.

Patented Mar. 6, 1934

1,949,610

UNITED STATES PATENT OFFICE 1,949,610

METHOD OF MAKING PACKING

Charles W. Marsh, Muskegon, Mich.

Application May 4, 1932, Serial No. 609,125

1 Claim. (Cl. 154—2)

The present invention relates to packing and methods of making the same, and is particularly concerned with the provision of an improved type of packing of substantially V shape, preferably made of leather or the like, which is peculiarly adapted to effect and maintain a fluid-tight joint under very adverse conditions for long periods of time.

V shaped leather packings of the same general type have usually been made in the form of closed rings, as shown in my prior applications, for the reason that it was thought that it would be undesirable or impossible to maintain the same fluid-tight condition if the packing rings were not continuous. I have discovered that V shaped leather packing rings of the type disclosed in my prior applications may be made equally effective when the ring is in the shape of a preformed circular strip of substantially V shape having its ends abutting against each other, provided a plurality of packings are used and the abutting joints in the respective packings are staggered, with the packings nesting in each other.

The discovery of this property of V shaped packings of this type enables the use of the packing in the form of a preformed strip, which is preferably curved to the approximate shape of the members which the packing is intended to engage, and the packing need not consist of a continuous ring, but the preformed curved V shaped strips may be cut off to the proper length to extend about the periphery of a wide range of different sizes of various members with which the packing is intended to be used.

The use of continuous circular rings necessitates keeping in stock a large number of different packing rings of various sizes, widths and diameters, because a ring of different diameter had to be provided for every different size of piston or rod to be packed, but the packings constructed according to the present invention may be made to fit a multiplicity of different sizes of rods, pistons or the like, and only a small stock of different types of the present packing need be kept on hand.

One of the objects of the present invention is the provision of an improved V shaped leather packing which is adapted to be used for packing rods, pistons or the like of different sizes without the necessity for providing a packing of specific diameter for each size of rod, piston or the like.

Another object of the invention is the elimination of the necessity for a large stock of packings of different diameters in order to supply the trade with V shaped circular packings capable of maintaining a fluid-tight joint for long periods of time without necessity for replacement or repair.

Another object of the invention is the provision of an improved V shaped packing of the class described and an improved packing assembly which is adapted to be automatically expanded and fed edgewise to effect a continuous taking up of the wear of the packing and to maintain a fluid-tight joint for a much longer period of time than can be obtained by any of the devices of the prior art.

Another object of the invention is the provision of an improved method of making packing, which results in the formation of an improved type of packing which may be made to fit rods, pistons or other members of various diameters, shapes and sizes, and to maintain a fluid-tight connection between moving parts for a long period of time without replacement.

Another object of the invention is the provision of a method of the class described, which is efficient, economical and well adapted to the formation of V shaped leather packing in predetermined form so that the packing may be shaped into helical strips capable of being expanded or contracted throughout a range of different diameters.

Other objects and advantages of the invention will be apparent from the following description and from the accompanying drawing, in which similar characters of reference indicate similar parts throughout the several views.

Referring to the single sheet of drawing accompanying this description,

Fig. 1 is an elevational view in perspective of a helical strip of packing constructed according to the present invention;

Fig. 2 is a diagrammatic illustration of one type of apparatus which may be employed for carrying out the method described herein;

Fig. 3 is a front elevational view, with the packing in section, of the apparatus employed in the crimping operation;

Fig. 4 is a similar view of the apparatus employed in the trimming operation;

Fig. 5 is a similar view of the drum and roller, taken from the bottom of Fig. 2, employed in the spooling operation;

Fig. 6 is a diagrammatic illustration of the type of expanders preferably employed with packings of the type covered by this application, showing the action of the expanders on the packing; and Fig. 7 is an elevational view showing another type of joint between the ends of the packing strip forming a ring.

The packing constructed according to the present invention is preferably made out of the best leather, and in order that the characteristics of the packing may be clearly understood reference is made to Fig. 6.

The leather packing strip, which is indicated in its entirety by the numeral 10, is preferably substantially V shaped in cross section, being provided with a pair of flanges 11 and 12 located at an angle to each other. The flanges 11 and 12 are joined together at the apex 13 of the V shaped packing, and the edges of the flanges 11 and 12 are beveled off and provided with substantially flat surfaces 14 and 15 which are substantially parallel to each other. The surfaces 14 and 15 are preferably at an acute angle with the interior surfaces 16 and 17 of the packing forming a relatively sharp edge 18 and 19 at the extreme edge of each flange 11, 12. The surfaces 14, 15 are intended to be fed into engagement with the walls of the cylinder, rod, piston, or other member which engages the packing, and the packing is preferably so disposed that the pressure of the fluid is greater on the inside of the packing, that is, adjacent the surfaces 16, 17, than on the opposite side or outside, so that the fluid pressure urges the sharp edges 18, 19 into engagement with the walls of a complementary moving part.

The packing is preferably provided with a pair of expanders 20, 21, the sectional shape of which is shown in Fig. 6, and these expanders are adapted to change the shape of the packing in such a manner that the packing is fed edgewise. The upper or inside expander 21 is preferably provided with a curved convex surface 22 of such curvature that the upper expander 21 comes into initial engagement with the inside of the packing at points 23, 24 adjacent the sharp edges 18, 19.

The outside expander 20 is preferably provided with a concave curved surface 25 which is adapted to initially engage the apex 13 of the packing 10. The packings are resiliently urged toward each other by a resilient member, such as a helical spring 26 or spring of any other suitable shape, and the expanders 20, 21 tend to decrease the angularity between the flanges 11 and 12 and to cause the leather to be fed edgewise into engagement with the complementary moving part. For example, the range of movement of the leather packing in edgewise direction is illustrated by the dotted line position of the packing in Fig. 6.

The packings are preferably arranged in the form of circular rings or helical coils nesting in each other substantially as shown in Fig. 6, with the expanders on the opposite sides of the packing. In such case each successive turn or coil of packing nests in the next adjacent packing and serves to transmit to it the force received from the expanders and all of the coils of packing are expanded simultaneously. The coils of packing are preferably in the form of curved strips of the type shown in Fig. 1, the strips being cut off to form rings of sufficient size when the ends of the strip are brought into abutting relation with each other. It is sufficient to form a butt joint between the ends of the strip which forms a ring when the joints are staggered in successive layers of the packing rings, but if desired, the edges of the packing may be beveled at the ends of the strip forming a ring, as shown in Fig. 7, for the purpose of improving the joint. In some cases the ends may be cemented together either before or after the packing is put in place. Continuous coils of helically wound packings may also be employed instead of cutting the coils into separate rings with abutting ends, but in such case the expansion rings are preferably shaped to accommodate the abuting end of the helical coil or the ends of each helical coil are preferably beveled off very gradually so as to shape the ends of the helical coils so that they will be brought into contact with the expansion members at each end without the abrupt step or shoulder that would be present where the end of the helical coil is cut off squarely.

Referring to Figs. 1 to 5, the packing strip 10 is preferably made in the form of a helical coil of predetermined diameter having a multiplicity of turns of the type shown in Fig. 1. A helical packing strip of the type shown in Fig. 1 may be employed for packing rods, pistons or the like of a greater or lesser diameter than that shown in Fig. 1, since the helical strip may be expanded or contracted to change the diameter of the coil. The diameter of any particular packing would depend upon the length of strip cut off and formed into a ring, and it is evident that it is not necessary to carry in stock V shaped rings of a multiplicity of different diameters, since the helical packing is capable of being adapted to a wide range of sizes.

The method of making packings will now be described, as follows: A piece of leather of suitable quality is first formed into strips of predetermined width. The strips may consist of straight or curved strips of leather, the ends of which are cemented together by a leather cement which is capable of resisting the attacks of water, oils, acids, alkalis, or other liquids with which the packing might come in contact. The type of cement employed would depend upon the service to which the packing was to be subjected.

The leather strip may also be formed with a minimum amount of loss by cutting the strips spirally out of a suitable piece of leather and thus forming one continuous strip of leather of spiral shape without waste.

The leather is first placed in what is termed a "sammy" condition, in which condition it has sufficient moisture to make it pliable, to permit the forming of the leather packing, and to effect trimming easily. Any of the known methods of placing the leather in a "sammy" condition may be employed, and the proper procedure to effect this result will be evident to one skilled in the art.

The leather strip is then subjected to a forming or crimping operation by means of the apparatus adapted to shape the strip to a substantially V shaped cross section, as shown in Fig. 3.

Fig. 2 is a diagrammatic illustration of the complete apparatus employed in the successive steps in the formation of the packing, while Figs. 3, 4 and 5 show the elevational views of the various types of apparatus located above Figs. 3, 4 and 5 and forming a part of Fig. 2. The leather strip progresses from the left to the right in Fig. 2 through the forming or crimping apparatus 27, the trimming apparatus 28, to the spooling apparatus 29. The crimping, trimming and spooling devices are preferably so synchronized that they operate with just a trifle of looseness at the spooling so as not to put too much tension on the packing when wound upon the spool or drum 30.

While the crimping, trimming and spooling devices are shown in line with each other in Fig. 2, they may not be so arranged in the finished machine by reason of the lack of space or the necessity for a different arrangement to effect a mechanical connection, and there may be a twist in the leather packing between the trimming and spooling or other operations to adapt the apparatus to a convenient position in the machine, provided it is not made so great as to affect the characteristics of the packing.

The crimping apparatus preferably comprises a rotatably mounted roller 31 having a periphery with diverging frusto-conical surfaces 33, 33', thereby giving the periphery a substantially V shape for engaging the inside of the packing. The opposite roller 32 is provided with substantially complementary frusto-conical surfaces 34, 35 for engaging the outside of a packing strip, and when the soft and pliable leather is passed through the rollers 31, 32, the leather strip is changed from the flat shape shown at 36 to a strip of V shaped cross section as shown at 37, by the application of the pressure of the rollers 31, 32.

The trimming apparatus 28 preferably includes a pair of rotatably mounted rollers 38, 39 similar in shape to the rollers 31, 32 respectively, but slightly narrower, the rollers 38 and 39 being of a thickness corresponding to the width of the packing desired, measured from the surface 14 to the surface 15 on the packing strip.

The trimming apparatus is also provided with a rotatable shaft 40 which carries a pair of circular knives 41, 42. The knives 41, 42 are provided with flat surfaces 43 adjacent the flat ends of the rollers 38, 39, and the sharp peripheral edges of the circular knives 41, 42 are adapted to trim the edges of the V shaped strip 37 to provide the packing with the sharp edges 18, 19 and beveled surfaces 14, 15.

The knives 41, 42 may slidably engage the sides of the rollers 38, 39 and clip off the edges of the leather strip, irrespective of the direction of rotation of the knives, but the knives 41, 42 are preferably rotated downward with respect to the upwardly extending flanges 11, 12 of the packing strip 37, or counterclockwise in Fig. 2, to effect a clean cut of the strip with less difficulty.

As the leather strip proceeds from the trimming apparatus, as at 44, it is in a substantially V shape, as shown in Fig. 6.

The spooling apparatus 29 preferably consists of a drum 30, which may be provided with a ring 45 fixedly secured on the drum 30. The ring 45 is formed with a V shaped groove 46 on its upper side in Fig. 5, the groove being substantially complementary to the external surface of the V shaped packing so as to provide axial support for the packing on the drum 30. The thrust ring 45 may be formed with an offset at 47 to accommodate the end of the packing strip, and with a groove 48 for receiving the flattened end of the strip. A set screw 49, for example, may be threaded into the ring 45 for securing the end 50 of the leather strip in the groove 48. Any convenient form of securing device may be employed for securing the end of the packing on the spooling drum 30. The drum 30 rotates in a clockwise direction in Fig. 5, and the V shaped packing strip is wrapped helically upon the drum 30. As the strip is wrapped upon the drum, it is engaged by a roller 51 which has a pair of frusto-conical surfaces 52, 53 disposed at the same angle which the flanges 11, 12 of the packing bear to each other.

The roller 51 preferably rotates in a counterclockwise direction in Fig. 5, with the shaft 54, and as the packing is wrapped upon the drum 30 the roller 51 is moved axially of the drum by appropriate mechanical connections. The roller 51 is thus adapted to effect a uniform winding of the successive turns of packing on the drum 30, each turn being nested in the adjacent turn, and the V shaped section of the packing being carefully preserved while the packing is wrapped in helical form.

The drum or cylinder 30 is preferably made of galvanized iron or other suitable material capable of resisting corrosion.

The helical packing is kept upon the cylinder 30 until it becomes dry and, if desired, it may be subjected to a drying atmosphere of predetermined temperature to effect a quicker drying.

The helical packing is then treated with various waxes or greases suitable for the purpose for which the packing is to be used and capable of resisting the action of water, or oil, acids, alkalis, heat, or other conditions.

The present method is thus adapted to produce a packing of substantially V shape in helical form so that the packing may be cut off as desired and expanded or contracted to form rings of various sizes. The joints between the ends of the strip forming a ring are preferably staggered in the packing assembly, but the packing is capable of maintaining a fluid-tight joint for long periods of time without necessity for replacement or repair by reason of the expansion and edgewise feeding action of the V shaped packing rings.

It should be noted that while the various steps in the process of manufacture have been described in predetermined succession, the steps need not necessarily be performed in the same succession, and any or all of the steps may be performed simultaneously by means of suitable machinery, and I do not wish to limit myself to any particular succession or order of the steps of my method.

While I have illustrated a preferred embodiment of my invention, many modifications may be made without departing from the spirit of the invention, and I do not wish to be limited to the precise details of construction set forth, but desire to avail myself of all changes within the scope of the appended claim.

Having thus described my invention, what I claim as new and desire to secure by Letters Patent of the United States, is:

The method of making packing which comprises forming a continuous strip of leather of predetermined width, placing the leather strip in a "sammy" condition, compressing said strip and shaping said strip by rolling the strip between two substantially complementary rollers of substantially V shape, holding said strip in V shape between a pair of rollers and beveling the edges of said strip to form sharp lips, rolling said strip upon a mandrel while said strip is in substantially V shape, nesting the successive spiral turns of said V shaped strip upon said mandrel, and subjecting said strip to a curing operation while held upon said mandrel.

CHARLES W. MARSH.